(12) United States Patent
Lanza et al.

(10) Patent No.: US 10,717,563 B2
(45) Date of Patent: Jul. 21, 2020

(54) REUSABLE BULK-SIZED SHIPPING BOX

(71) Applicant: Utility Packaging Systems, Rye, NY (US)

(72) Inventors: Joseph Lanza, Rye, NY (US); James Maione, Rye, NY (US); Joshua Hauge, Rye, NY (US)

(73) Assignee: Utility Packaging Systems, Rye, NY (US)

( * ) Notice: Subject to any disclaimer, the term of this patent is extended or adjusted under 35 U.S.C. 154(b) by 103 days.

(21) Appl. No.: 16/152,666

(22) Filed: Oct. 5, 2018

(65) Prior Publication Data

US 2019/0168910 A1    Jun. 6, 2019

Related U.S. Application Data

(60) Provisional application No. 62/568,561, filed on Oct. 5, 2017.

(51) Int. Cl.
| | |
|---|---|
| *B65D 5/16* | (2006.01) |
| *B65D 6/18* | (2006.01) |
| *B65D 88/52* | (2006.01) |
| *B65D 25/54* | (2006.01) |
| *B65D 5/36* | (2006.01) |

(52) U.S. Cl.
CPC ............ *B65D 11/1853* (2013.01); *B65D 5/16* (2013.01); *B65D 5/3628* (2013.01); *B65D 25/54* (2013.01); *B65D 88/524* (2013.01)

(58) Field of Classification Search
CPC ............ B65D 11/1853; B65D 11/1846; B65D 11/186; B65D 25/54; B65D 5/3628; B65D 5/16; B65D 88/524
See application file for complete search history.

(56) References Cited

U.S. PATENT DOCUMENTS

| | | | | |
|---|---|---|---|---|
| 3,262,631 A | * | 7/1966 | Belsinger ................. | B65D 5/16 229/122 |
| 3,738,564 A | * | 6/1973 | Persson .................... | B65D 5/16 229/110 |
| 3,891,137 A | * | 6/1975 | Ellison ..................... | B65D 5/16 229/121 |
| 6,112,979 A | * | 9/2000 | Deger ...................... | B65D 5/16 221/280 |

* cited by examiner

*Primary Examiner* — Stephen J Castellano
(74) *Attorney, Agent, or Firm* — Leason Ellis LLP

(57) ABSTRACT

Provided herein is a collapsible bulk-sized shipping box made of corrugated plastic. The rectangular box comprises four joined sidewalls, wherein left and right sidewalls are bisected by vertical fold lines allowing the sidewalls to be collapsed inwards. Bottom flaps also extend from the bottom of respective sidewalls and hinge inward about a fold line to provide a bottom side of the box when in use or fold flush with the sidewall when collapsed. The front wall of the box comprises a door flap that hinges inward and outward about a fold line. In addition, a door retaining puck attached to an outer surface of the front wall and configured to resist the door flap opening outward but deflect under application of sufficient force thereby allowing the door flap to open outward completely and provide access to the interior of the box.

20 Claims, 19 Drawing Sheets

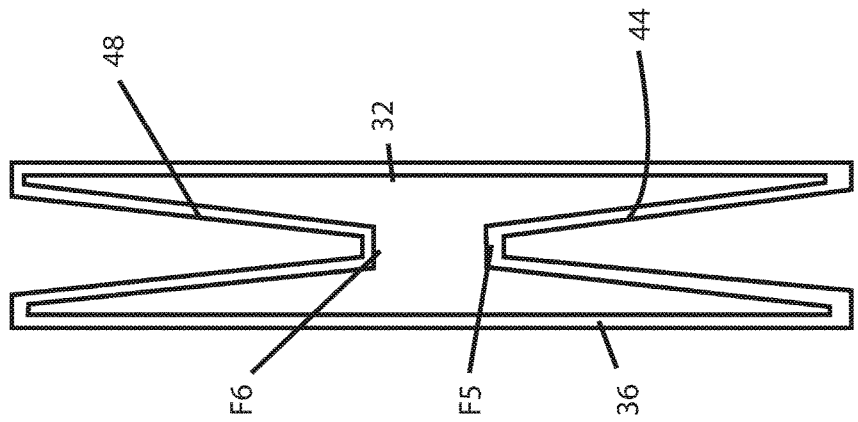
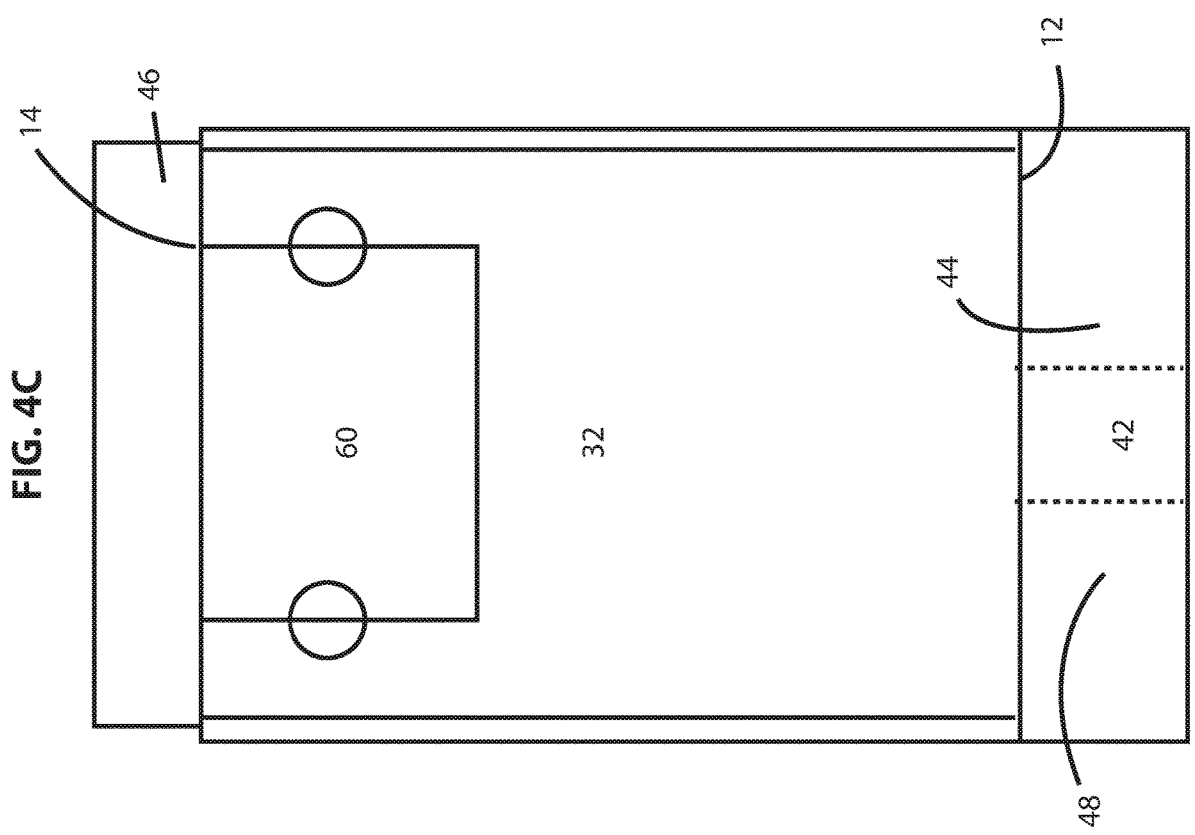

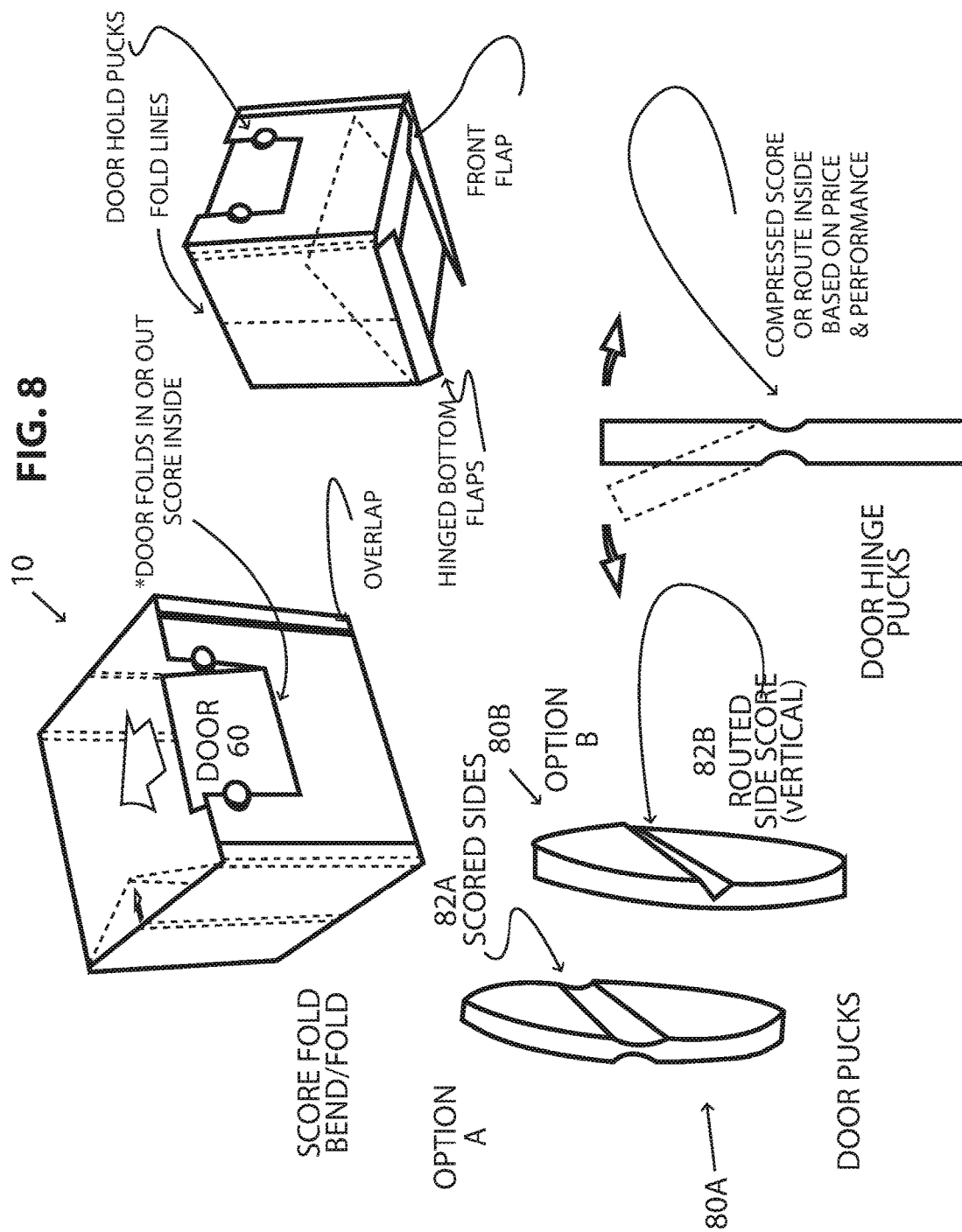

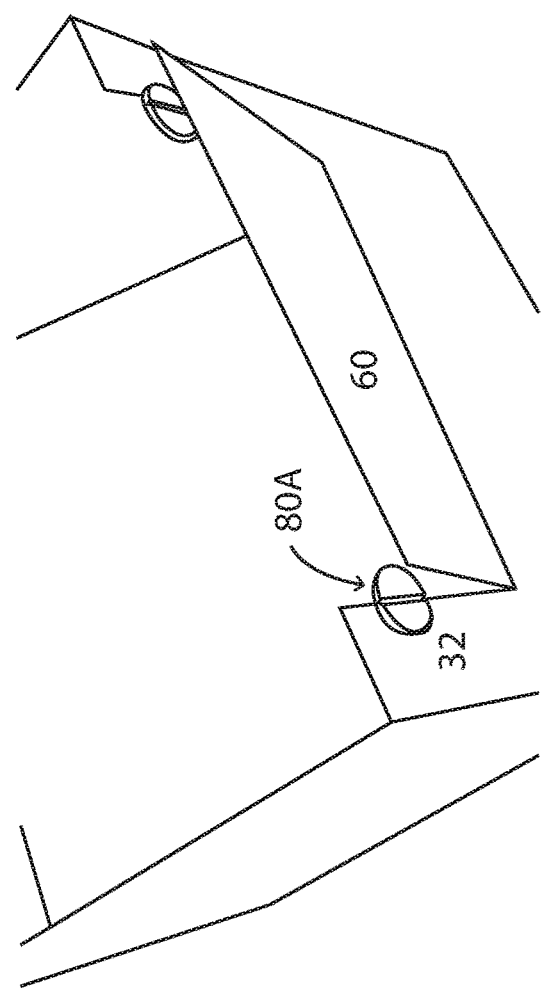
FIG. 9
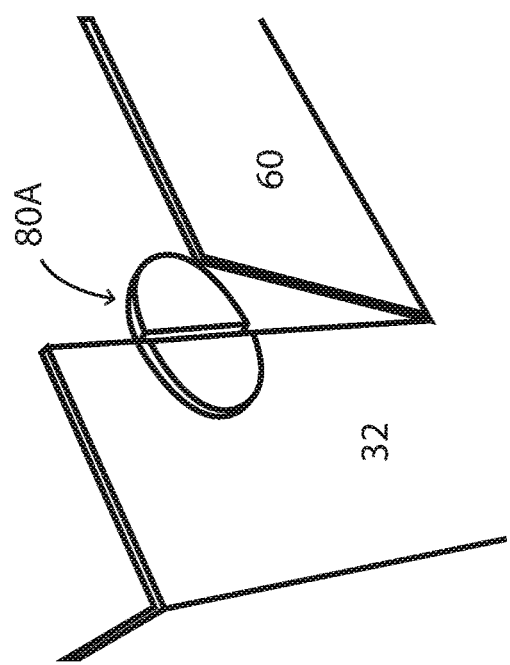

US 10,717,563 B2

REUSABLE BULK-SIZED SHIPPING BOX

CROSS-REFERENCE TO RELATED APPLICATIONS

The present application is related to and includes U.S. Patent Application Ser. No. 62/568,56, titled "Improved Shipping Box," filed Oct. 5, 2017, which is hereby incorporated by reference as if set forth in its entirety herein.

FIELD OF THE INVENTION

This patent application relates generally to boxes for shipping items, and more particularly to bulk-size shipping boxes made of corrugated-type material and used for containing and shipping smaller boxes or items.

BACKGROUND

Bulk sized shipping boxes such as those referred to as "Gaylord Boxes" are well known in the art. Traditionally, Gaylord boxes are bulk size corrugated cardboard boxes sized to fit on a pallet and that are used for the shipment and storage of smaller sized items. However, because of the design and construction of Gaylord boxes, Gaylord boxes are typically used only once, or perhaps a few times if care is taken when handling, rather than being suitable for repeated use and, therefore, lead to unnecessary waste and cost. Typically, when a Gaylord box reaches a destination for unpacking, a worker may remove the top cover (if there is one) placed over the open end of the box and remove the contents. Due to the bulk size of the box, when the level of the contents within the box gets below a certain level that is not easy to reach through the open top side, a worker will typically cut part of a side wall out so as to be able to reach the remaining contents. As a result the Gaylord box is destroyed and cannot be reused and, thus, is either thrown away or recycled. The corrugated cardboard material used to construct a Gaylord box also makes the box not suitable for reliable repeated use.

What is needed is a bulk-sized shipping box that are designed to withstand repeated use and that is designed to be easily unpacked and re-packed by a worker.

SUMMARY OF THE INVENTION

According to a first aspect, disclosed herein is a bulk-size shipping box configured to be transitioned between a collapsed state and an operative state for storing contents within an interior volume of the box. The box comprises a continuous series of panels made of a substrate material and arranged to define four sidewalls of a rectangular box. More specifically, the four walls include a front wall, an opposing back wall a right wall and an opposing left wall. The sidewalls extend from a bottom end of the box toward a top end of the box in a generally vertical direction and define a hollow central cavity of the box when in the operative state. In addition, each of the right wall and left wall are bisected by a vertical fold line extending in the vertical direction from the bottom end to the top end whereby the vertical folds enable the left and right walls to be collapsed inwards when transitioning the box from the operative state to the collapsed state.

The box further comprises a bottom flap extending from the bottom end of a respective sidewall. Further, a lengthwise fold line defines a border between the bottom end of the respective sidewall and an adjacent end of the bottom flap, wherein the bottom flap hinges about the lengthwise fold line in at least an inward direction, and wherein the bottom flap has a width such that the it extends at least partially across an internal footprint of the box when in an operative state.

The front wall of the box further comprises a door flap that is defined by two spaced apart elongate cuts through a front wall panel that extend generally vertically from a respective opposing end of a horizontal fold line to the top end of the front wall panel. Further, the door flap is configured to hinge about the horizontal fold line in the inward direction or an opposing outward direction and thereby provides an opening through the front wall and access to the interior volume of the box.

The box also includes a door retaining puck attached to an outer surface of the front wall. Moreover, a portion of the door puck that is not attached to the front wall extends across one of the two elongate cuts and an adjacent portion of the door flap thereby providing resistance against the door flap hinging outward. In addition, the door puck is configured to deflect outward when a given amount of force is applied against the door puck in an outward direction thereby enabling the door flap to be hinged outward.

These and other aspects, features, and advantages can be appreciated from the accompanying description of certain embodiments of the disclosure and the accompanying drawing figures and claims.

BRIEF DESCRIPTION OF THE DRAWINGS

FIG. 4B is a bottom plan view of the embodiment of FIG. 1 in a fully collapsed state in accordance with one or more embodiments of the invention;

FIG. 4C is a front-side plan view of the embodiment of FIG. 1 in a fully collapsed state in accordance with one or more embodiments of the invention;

FIG. 7A is a perspective view of exemplary door puck configurations in accordance with one or more embodiments of the invention;

FIG. 7B is a cross-sectional view of an exemplary door puck configuration in accordance with one or more embodiments of the invention;

FIG. 8 is a top perspective view and a bottom perspective view of an exemplary box in an expanded state in accordance with one or more embodiments of the invention;

FIG. 9 is a top perspective view and a close up view of an exemplary box with a partially opened door in accordance with one or more embodiments of the invention;

DETAILED DESCRIPTION OF CERTAIN EMBODIMENTS OF THE INVENTION

By way of overview and introduction, what is disclosed herein is an improved design for bulk-sized shipping box. In an exemplary embodiment, the box is an improved design of a container commonly referred to in the art as the "Gaylord box." According to one or more embodiments of the invention, the box is made using a resilient material, such as corrugated plastic, and is constructed in a manner that allows the box to be reused numerous times. In particular, the box is configured to be repeatedly transitioned between a collapsed state that is suitable for storing when not in use and an expanded state that is suitable for receiving contents (e.g., smaller packages) therein and then storing or shipping the loaded box. According to a further aspect of the invention, a door flap is provided on a front wall of the container. The door flap is configured to resist opening, say, due to the weight of the contents contained within the box, but can also be readily opened by a worker to provide the worker with better access to the interior of the box.

Figure 1:
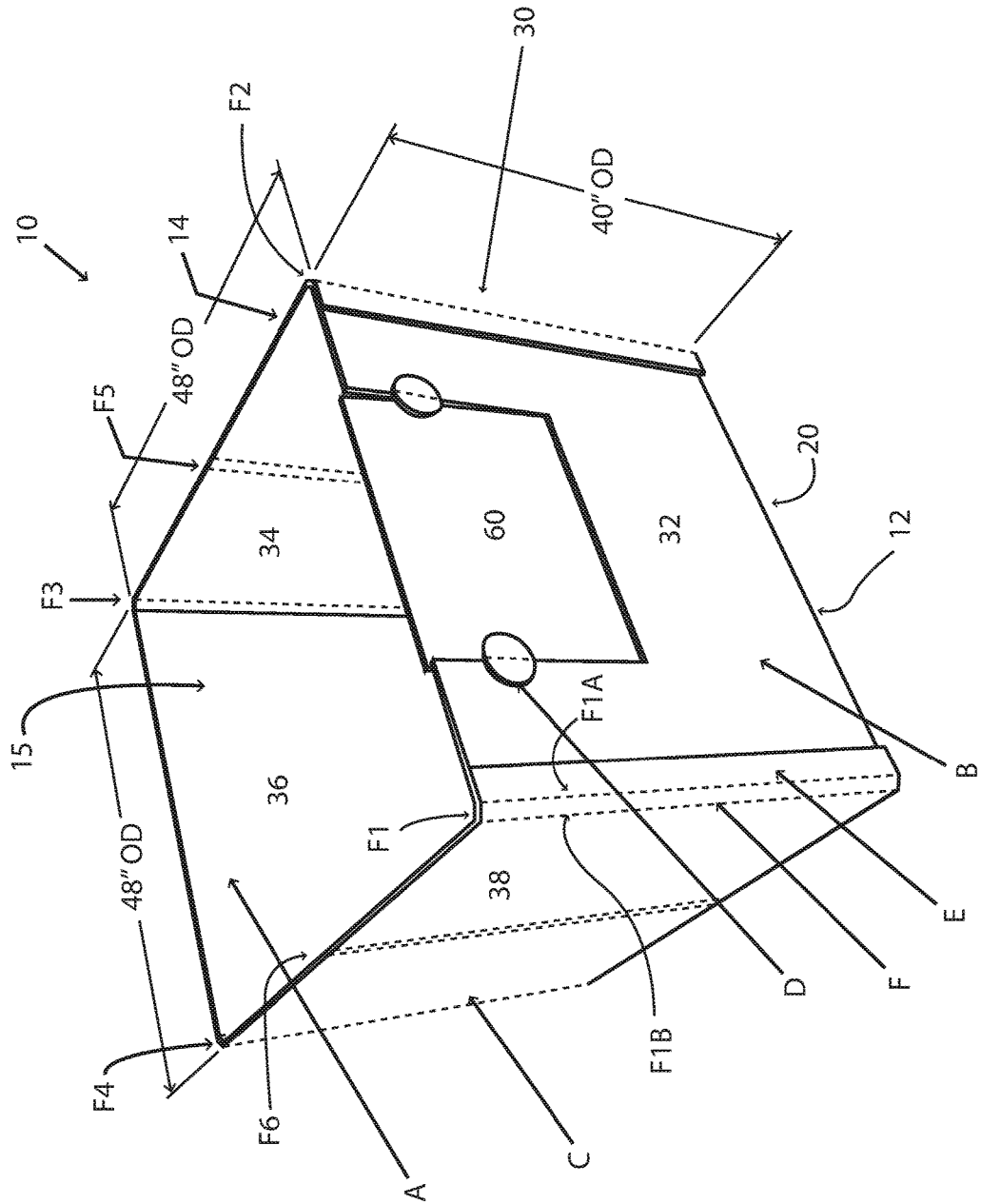
FIG. 1 is a top perspective view of an exemplary box in an expanded state in accordance with one or more embodiments of the invention.

Referring to FIG. 1, an exemplary box 10 is provided in accordance with one or more of the disclosed embodiments. In the exemplary embodiment shown in FIG. 1, the box is a large or "bulk-sized" shipping box used for storage or shipping on shipping pallets and has a 48"×48" (length× width) outer footprint and an outer height of 40" (without a top, not shown) similar to conventional "Gaylord" boxes. However, it should be understood that the box 10 can have different outer and inner dimensions depending on the application.

The box 10 comprises a substrate 20 in the form of one or more sections of substrate material. The substrate can be any number of robust natural, synthetic or composite materials that are suitable for providing a box having a suitably sound structure for its intended use and that can withstand repeated folding and multiple uses. For example and without limitation, the substrate material can be a corrugated plastic (e.g., a polymer) such as corrugated polypropylene. Exemplary corrugated plastic substrates are commercially available under the brand-name "Coroplast" from Coroplast, LLC of Vanceburg Ky. Corrugated plastics can be preferable to corrugated cardboard because it is a strong and resilient material that can withstand repeated uses with relatively less risk of structural weakening or destruction. Corrugated plastic is also beneficial in that it can be repeatedly folded (e.g., for compact storage) and unfolded for use without significant wear or degradation of the structural integrity of the fold lines. However, other resilient plastic and natural materials can be used as well without departing from the scope of the disclosed embodiments. It should also be understood that the construction of the substrate is not limited to corrugation and that the substrate material can be fabricated using other construction techniques known in the art including injection molding and the like.

As shown in FIG. 1, the four side walls of the box intersect at fold lines designated F1 through F4. The fold lines F1-F4 are generally vertically oriented and extend from a bottom end 12 of the box toward a top end 14 and, preferably, are parallel to one another. The vertical fold lines F1-F4, thus, define the corners of the box 10. Each fold can be formed by cutting, creasing, scoring, heat scoring or routing the substrate 20, a combination of any of the foregoing, or any other suitable processes known in the art for making fold joints in the substrate. Each fold can be defined by a continuous cut, crease, score, etc. or a series of individual processed sites intermittently spaced apart and arranged (e.g. linearly, evenly spaced, or both) along the length of the fold. Multiple fold lines can facilitate ease of folding and providing a collapsed box that has a generally uniform thickness. A fold line can comprise a single fold line or multiple fold lines that are spaced apart. For instance, corner fold F1 is defined by two spaced apart folds F1a and F1b shown in FIG. 1 formed by heat-scoring the substrate. For instance, due to the thickness of the substrate, multiple spaced apart fold lines in each corner allows multiple layers of material to be folded inward within the internal volume of the box when in a collapsed state without causing the corners or substrate layers to bend, stretch or compress unnecessarily.

As shown in FIG. 1, in accordance with one or more embodiments of the invention, the side walls of the box 10 are defined by a series of side panels 30, including panels 32, 34, 36 and 38. Each of the panels is disposed adjacent to another panel in the series. As further described herein, side panel 32 is referred to as the "front panel," side panel 36 is referred to as the "back panel," and side panels 34 and 35 are referred to as the "right side" and "left side" panels, respectively (when viewed from the perspective of the front panel 32). As shown in FIG. 1, the series of panels 30 are generally foldable along the corner fold lines F1-F4 along a common, parallel direction to define a hollow central cavity 15 for the box. Although not shown, it should be understood that the exemplary box can include a removable top that is placed over the top end 14 of the side-walls so as to enclose the interior volume 15.

Figure 2:
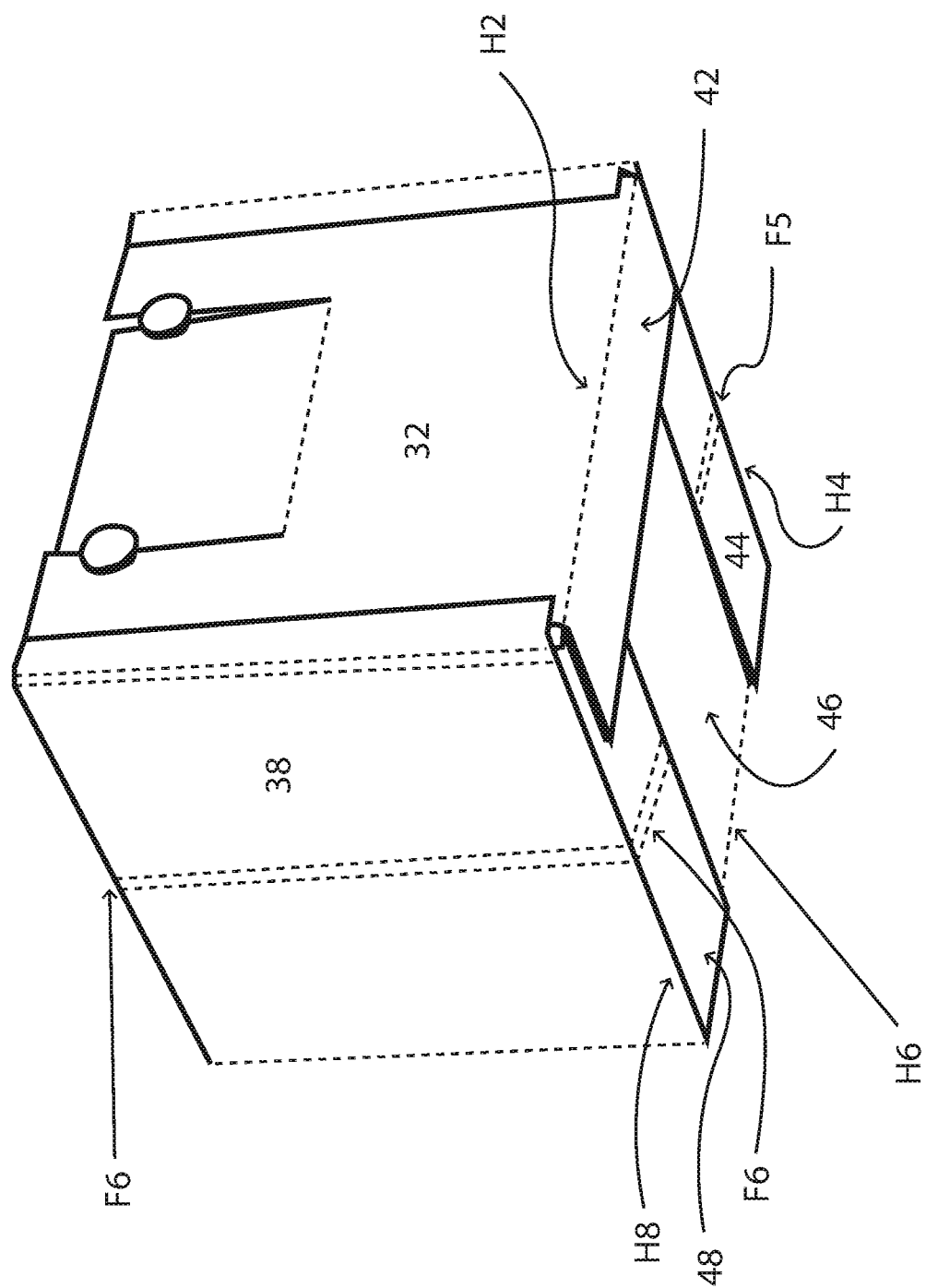
FIG. 2 is a bottom perspective view of the embodiment of FIG. 1 in accordance with one or more embodiments of the invention.

Preferably, one or more of the side panels include bottom flaps that extend from respective bottom ends thereof. In particular, referring now to FIG. 2, panel 38 includes bottom flap 48, panel 34 includes bottom flap 44 and panel 32 includes bottom flap 42. In some implementations, back panel 36 can also include a bottom flap, as shown in FIG. 2. Preferably, a continuous section of substrate is used to define a side panel and a respective bottom flap. However, in addition or alternatively, a bottom flap can be joined to a free end of a respective panel using, for example and without limitation, a hinge joint.

As shown in FIG. 2, the border between panel 38 and bottom flap 48 is defined by a horizontal fold H8, the border between panel 34 and bottom flap 44 is defined by a horizontal fold H4, the border between panel 32 and bottom flap 42 is defined by a horizontal fold H2 and the border between panel 36 (not shown) and bottom flap 46 is defined by a horizontal fold H6. As can be appreciated from FIG. 2, the folds extend substantially the length of the respective side-wall and the bottom flaps are foldable along respective fold lines in a direction which is substantially perpendicular to the direction of the vertical corner fold lines F1-F4. When folded inward into position along respective fold lines, the bottom flaps define a bottom side of the box 10.

It should be understood that the length (i.e., how far along the side of the box that the flap extends) and width (i.e., how far across the footprint of the box the flap extends when folded into position) of the bottom flaps can vary depending on the dimensions of the box. Preferably the bottom flaps extend the length of a respective side of the box and a width that extends at least partially across the internal footprint of the box when folded into position. For example, bottom flaps 48, 44 and 42 shown in FIG. 2 are sized to extend substantially the length of the sides of the box (e.g., ~48") and only partially across the bottom side. In such a configuration, the bottom flaps can provide structural rigidity to the box 10 when in an operative state and prevents gaps from forming in the event that a side wall is pushed outward to prevent items from falling through air gaps.

Figure 3A:
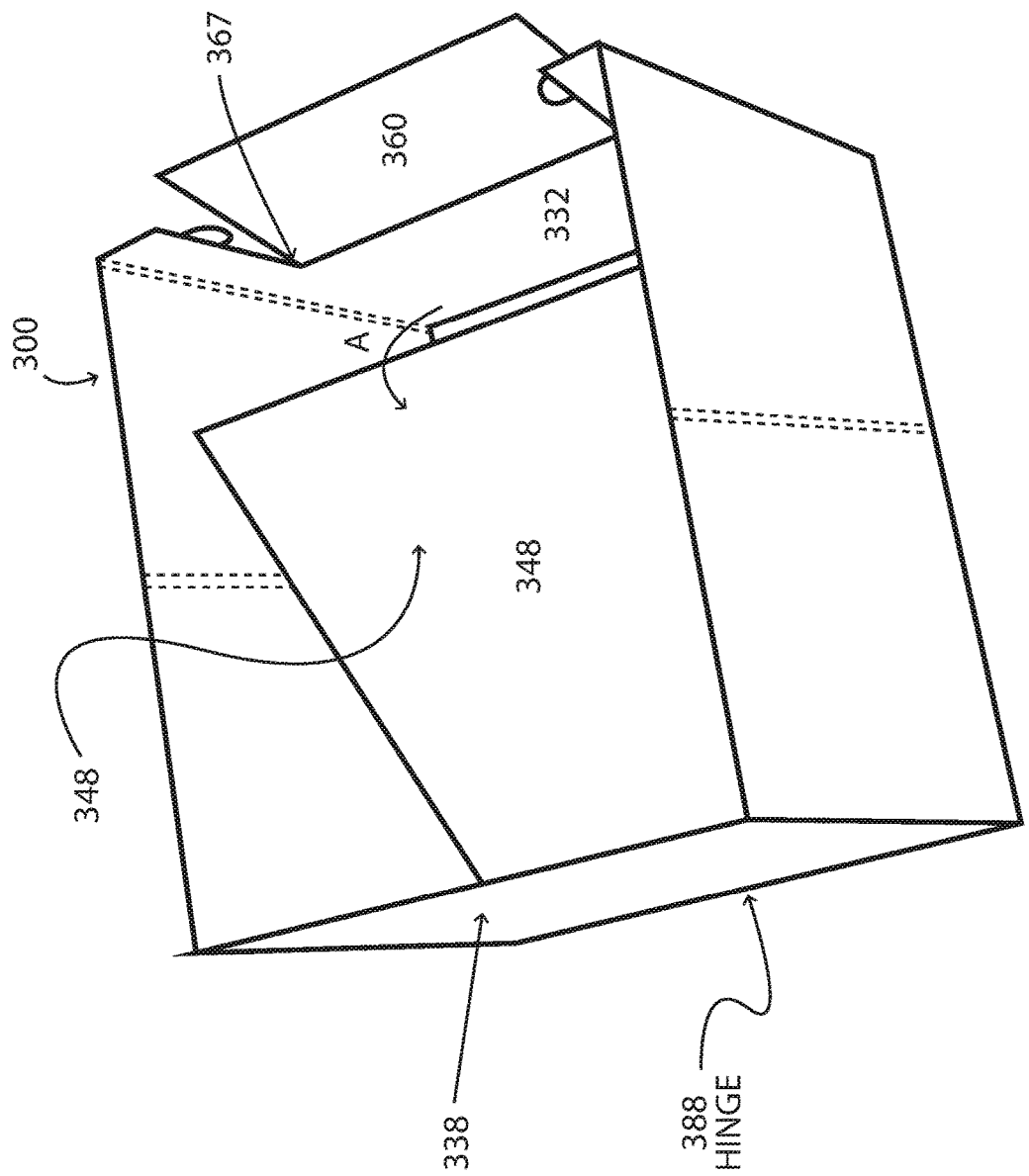
FIG. 3A is a top perspective view of an exemplary box in an expanded state and showing a bottom floor flap in a partially folded state in accordance with one or more embodiments of the invention.

In addition one or more of the bottom flaps can be sized differently from the other bottom flaps. For instance, preferably one of the flaps, e.g., flap 46 shown in FIG. 2, is sized to extend across the internal length and width of the box 10 so as to provide a continuous bottom floor for supporting contents within the box. FIG. 3A is a diagram of an exemplary box 300 in accordance with one or more embodiments of the invention. As shown, box 300 includes a bottom flap 348, which has a similar configuration as flap 48 shown in FIG. 2, and which extends from the bottom end of the panel 338 and is sized to extend across the internal length and width of the box 300 so as to provide a continuous bottom floor for the box 300. Such a bottom flap aids in maintaining the structure of the box in the expanded state. In addition, when transitioning the box from a collapsed state (e.g., when flap 348 is folded up such that it abuts the interior surface of panel 338), pushing the bottom flap 348 downward in the direction of the arrow A shown in FIG. 3A serves to force any folded sidewalls apart to form a rectangular box structure.

Figure 3B:
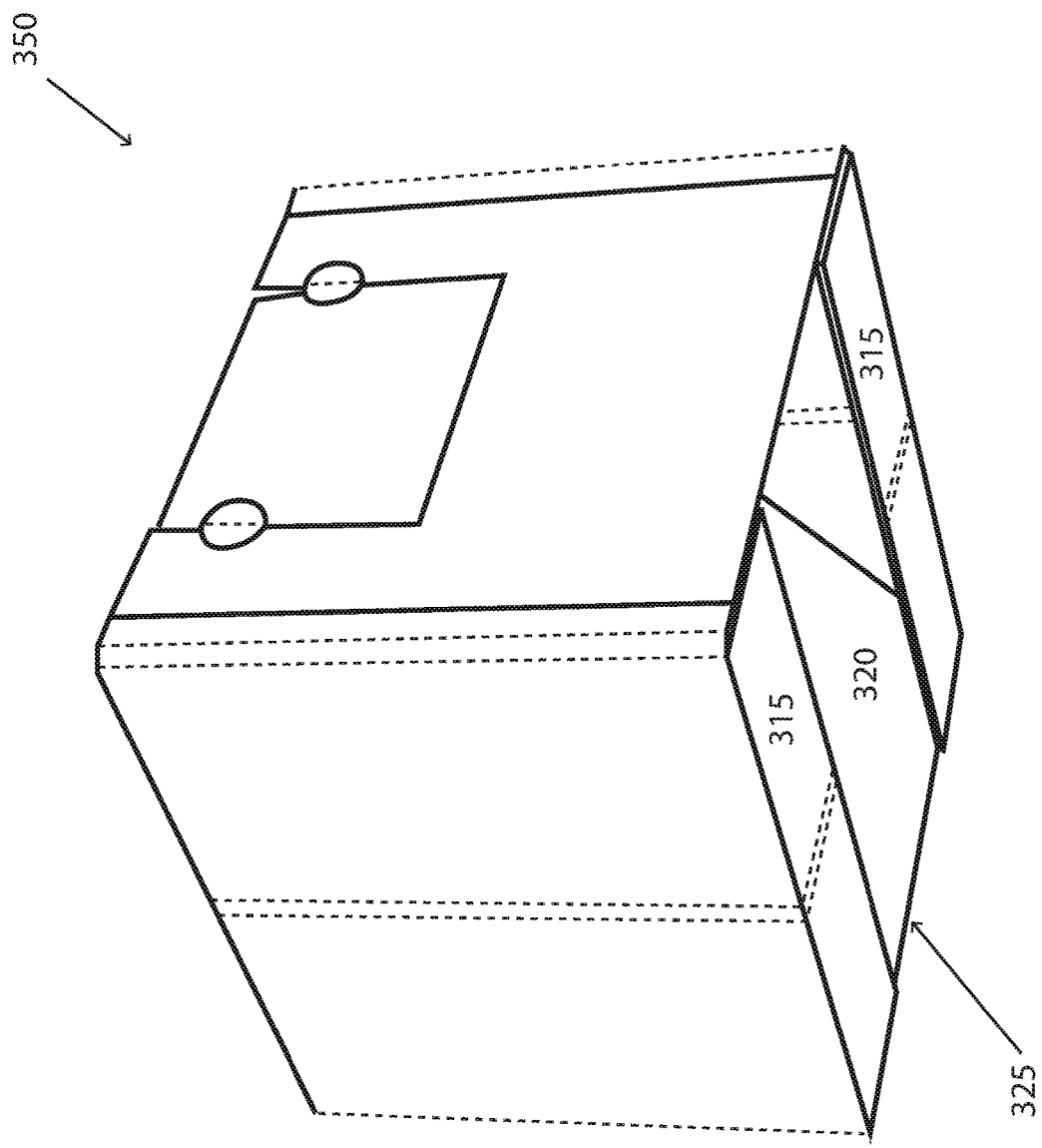
FIG. 3B is a bottom perspective view of an exemplary box in an expanded state and showing a bottom floor flap in a partially folded state in accordance with one or more embodiments of the invention.

It should be noted that, in an alternative configuration one or more of the bottom flaps can be made from a separate section of substrate and connected to their respective panels by a hinge joint. Moreover, in some configurations, one or more of the bottom flaps can be omitted. For example, FIG. 3B shows a configuration of a box 350 in accordance with one or more embodiments of the invention in which smaller bottom flaps 315 extend from the side-walls, a larger bottom flap 320 for providing a floor for the box (partially shown within the interior volume of the box) extends from a fold joint 325 between the bottom flap 320 and the back wall (not shown) and a fold extending from the front wall is omitted. It should also be understood that a larger flap defining a continuous box floor can extend from any one or more of the sidewalls.

Returning now to the exemplary configuration shown in FIGS. 1 and 2, the left and right side panels 34 and 35 can also include vertical folds F5 and F6, respectively. Folds F5 and F6 allows the side panels 34 and 38, respectively, to be collapsed inwards. As shown in FIG. 2, the folds F5 and F6 also extend across the width of the bottom flaps 44 and 48, respectively.

By folding the side panels 38 and 34 (and bottom flaps) about folds F6 and F5 (e.g., advancing the middle of opposing side walls inwards toward one another), the side walls can be folded in half and the box 10 can be transitioned into a collapsed state suitable for storage. From the collapsed state the box 10 can be transitioned to an expanded state that is suitable for use, by pulling opposing side walls apart (in opposite directions) so that side panels 34 and 38 unfold along folds F5 and F6 to form a rectangular box structure. In some configurations, as shown in FIGS. 1-2, folds F5 and F6 can comprise multiple spaced apart fold lines that, as noted, facilitate transitioning the box between a collapsed state and an expanded state.

Figure 4A:
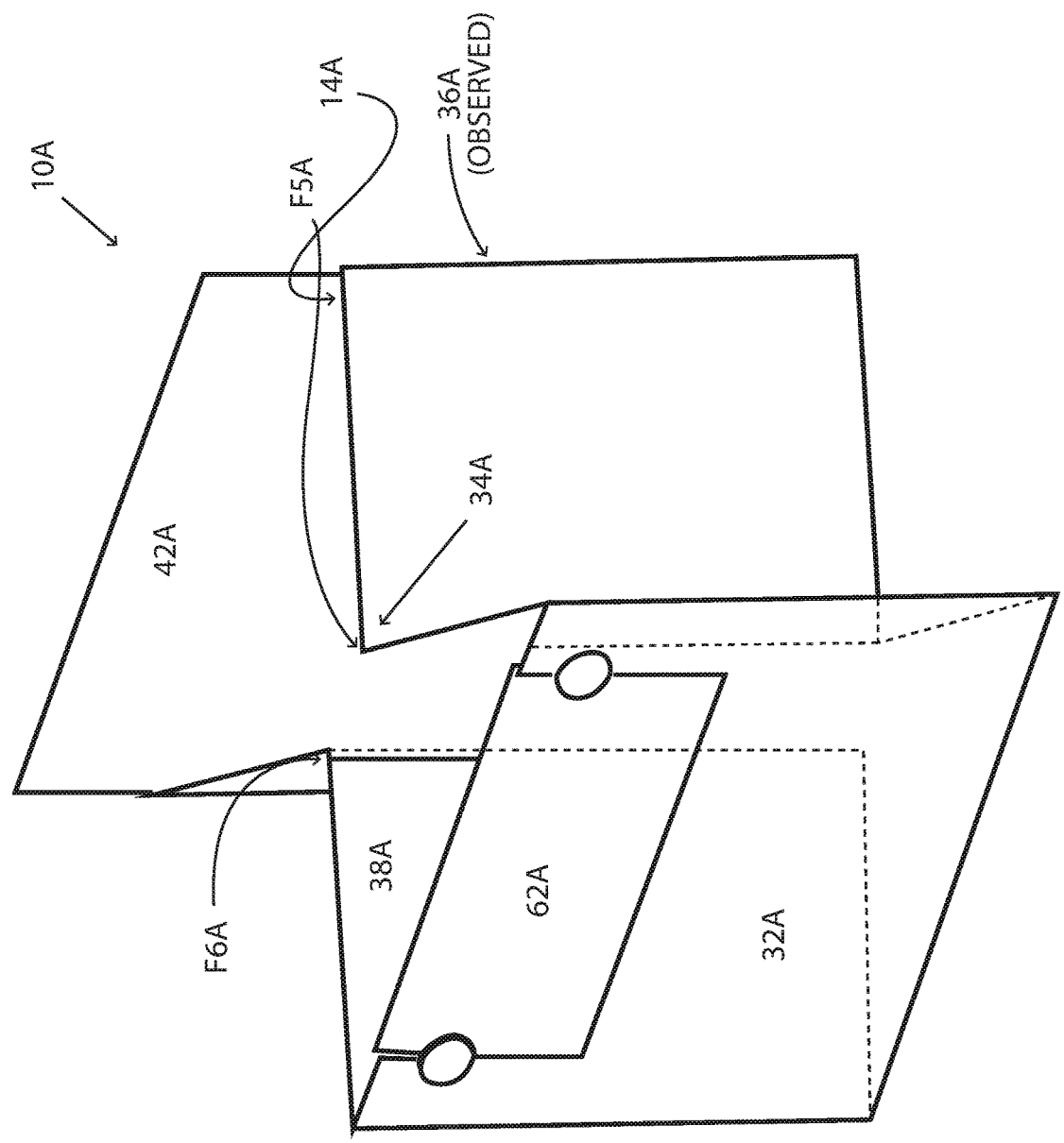
FIG. 4A is a top perspective view of an exemplary box in a partially collapsed state in accordance with one or more embodiments of the invention.

FIG. 4A is a diagram of the box 10a having side panels 34a and 38a partially collapsed inward, respectively, in the direction of the arrows shown in FIG. 4A. It should be understood that the particular configuration of the box 10a shown in FIG. 4A is slightly different from the configuration of the box 10 shown in FIG. 1 in that it includes alternative shape for the front door 60a that has radiused bottom corners instead of the square bottom corners of door 60 shown in FIG. 1. In addition, the box shown in FIG. 4A has a bottom floor flap 42a that extends from the bottom end of the back wall 36a (not shown, obscured by bottom flap 42a). As shown in FIG. 4A, the bottom flap 42a is effectively folded such that it extends vertically beyond the top end 14a of the sidewalls when so folded. As shown in FIG. 4A, collapsing the two halves of side panels 38a and 34a together along folds F5a and F6a serves to advance folds F5a and F6a inwards in the direction of the arrows shown in FIG. 4A and also serves to bring the front and rear side walls of the box together. Collapsing the sides 34a and 38a completely provides a generally flat collapsed box 10a. FIG. 4B is a cross-sectional view through the collapsed box 10 of FIG. 1 from the bottom side in accordance with the embodiment described above and shows the relative relationship of the different panels with the box 10 in the fully folded configuration. FIG. 4C is a front view of the collapsed box 10 showing folded bottom flaps 44 and 48 extending beyond the bottom side 12 behind front side panel 32 and bottom panel 42 (i.e., the box floor) extending beyond the top end 14.

Figure 6:
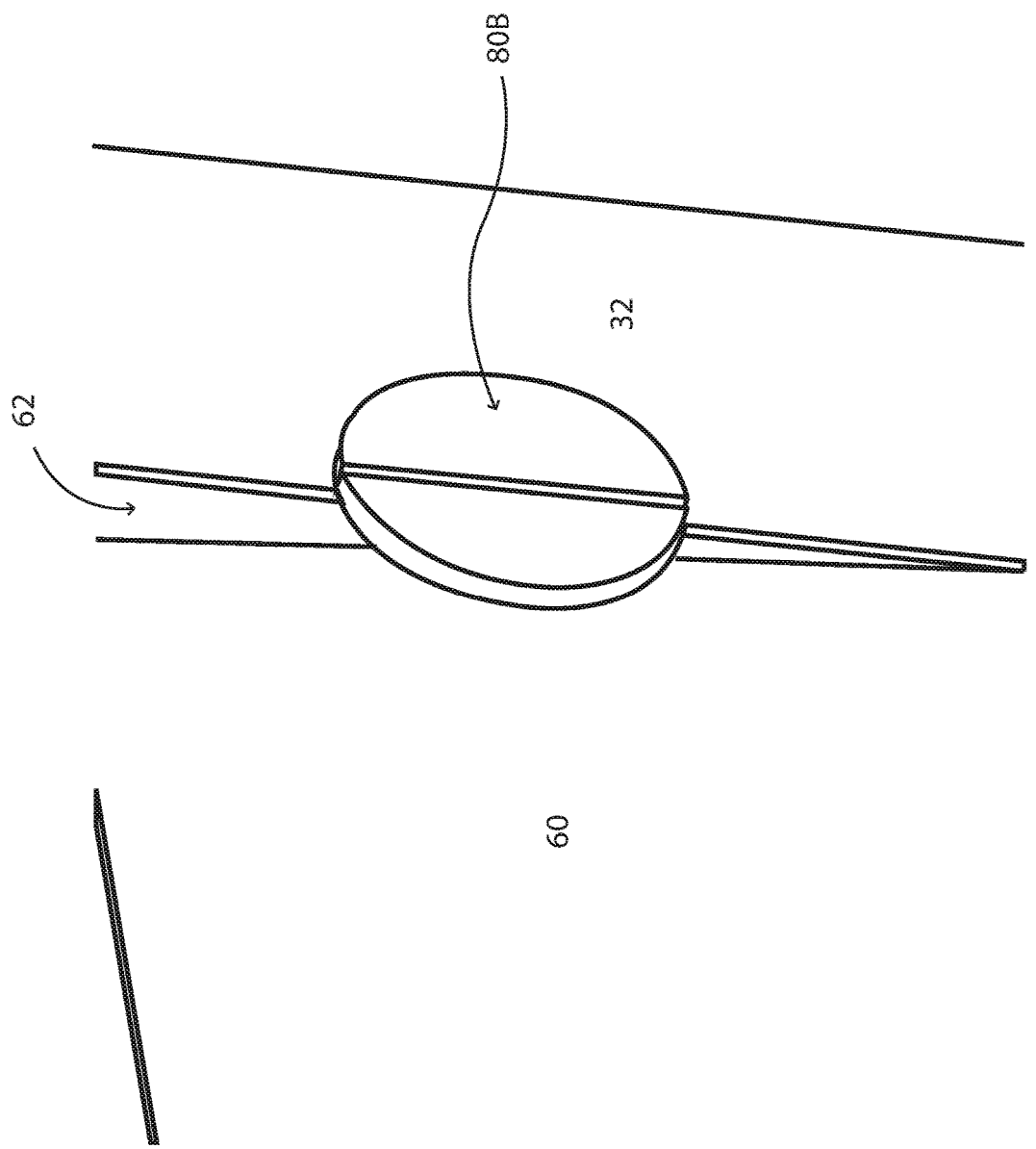
FIG. 6 is a close up view of an exemplary door and puck configuration in accordance with one or more embodiments of the invention.

In the exemplary configuration of the box 10 shown in FIG. 1, each of panels 32, 34, 36 and 38 is a separate section of substrate that is joined to adjacent panels to define the box 10. FIG. 6 is another view of box 10 shown in FIG. 1 highlighting the configuration in which panels 32, 34, 36 and 38 are joined together by overlapping end margins of adjacent panels and joining the overlapping margins together with a securement. In particular, with further reference to FIG. 6, a securement 70 extends along an end margin of the panel 38 and permanently joins panel 38 to adjacent panel 32. The securement 70 comprises one or more bonds (e.g., thermal or adhesive) made between opposing and overlapping surfaces of panels 38 and 32 so as permanently connect those panels. A similar securement 72 is also shown to be provided at the end margin of panel 34 to join panel 34 to panel 32. Similar securements are provided at opposite end margins of panels 38 and 34 joining panel 36 there-between and, thus, providing a box having a rectangular configuration.

The bonds between adjacent panels are preferably formed by heat welding; however, the bonds can comprise other generally permanent connections as understood by those skilled in the art. Preferably, the bond is "permanent" in that it is of such character that it is not readily opened, and yet is sufficiently strong to permit the box to be folded along fold lines F1-F4 when transitioning the box between a flat condition and an operative condition (e.g., expanded box surrounding the internal volume 15). Optionally, the bond comprises a series of individual bond sites intermittently spaced apart and arranged (e.g. linearly, evenly spaced, or both) along the height of a panel to define the securement.

Each such bond site can be formed by applying heat and pressure such that the overlapping panels are adhered to one another.

Due to the overlapping and joined configuration of the adjacent panels, it can be appreciated that the individual panels do not necessarily intersect at the corner folds F1-F4. For instance, in the exemplary configuration of box 10, corner folds F1 and F4 are provided near opposite ends of panel 38, corner folds F2 and F3 are provided near opposite ends of panel 34 and panels 36 and 32 do not include corner fold elements. In an alternative configuration, two or more of the panels can be constructed from a continuous section of substrate. For instance panels 38 and 32 can be formed from a continuous section of substrate, thereby obviating the need for the securement 70 joining panels 38 and 32. By way of further example, a continuous substrate can be cut and folded to define the series of panels 32, 34, 36 and 38 and thereby requiring only a single securement to join opposite margins of the series of panels and form a rectangular, foldable box structure.

In accordance with a salient aspect of the present invention, the box 10 can be configured in a partially assembled state in which the hollow central cavity 15 is defined, yet which is collapsible into a generally flat state until such time that items are to be placed into an expanded box. When the box 10 is to be used/filled, it is brought to an expanded state so as to define a substantially rectangular box construction and the bottom flaps are folded along respective fold lines to define the bottom side of the box. As noted, fold lines F5 and F6 preferably extend the height of the respective sidewall and the width of the bottom flap extending from the bottom end of the respective sidewall. Accordingly, bottom flaps 48 and 44 can be oriented co-planar with respective side-walls, and the sides/flaps folded along folds F5 and F6 to provide a collapsed box 10. In addition, when in use and bottom flaps 48 and 44 extend perpendicularly inward from sidewalls 38 and 34, respectively, the flaps provide structural rigidity by preventing the sidewalls 38 and 34 from folding along fold lines F6 and F5.

Preferably, the material of the substrate 20 has a thickness so that, in combination with the fold lines F1 through F6, a stable, expanded state results in which the interior volume 15 of the box 10 can be filled with material without significant deformation and, when covered by a top, can also be stacked, one upon another, to promote efficient storage and usage. In addition, as a beneficial result of the specific layout of the panels, folds and bottom flaps, as well as the materials used, the box can be easily transitioned into an operative state by simply expanding the box and folding the bottom flaps into position and provides a structurally sound bulk-sized shipping box that can maintain its expanded state without requiring any additional permanent or temporary attachment of panels to maintain the expanded state.

According to a further salient aspect of one or more embodiments of the invention, one or more walls of the box can include a door. As noted, the door can be configured to resist opening, say, due to the weight of the contents contained within the box during storage or shipping, but can also be readily opened by a worker so as to allow the worker to access the interior of the box and retrieve any items therein.

Figure 5:
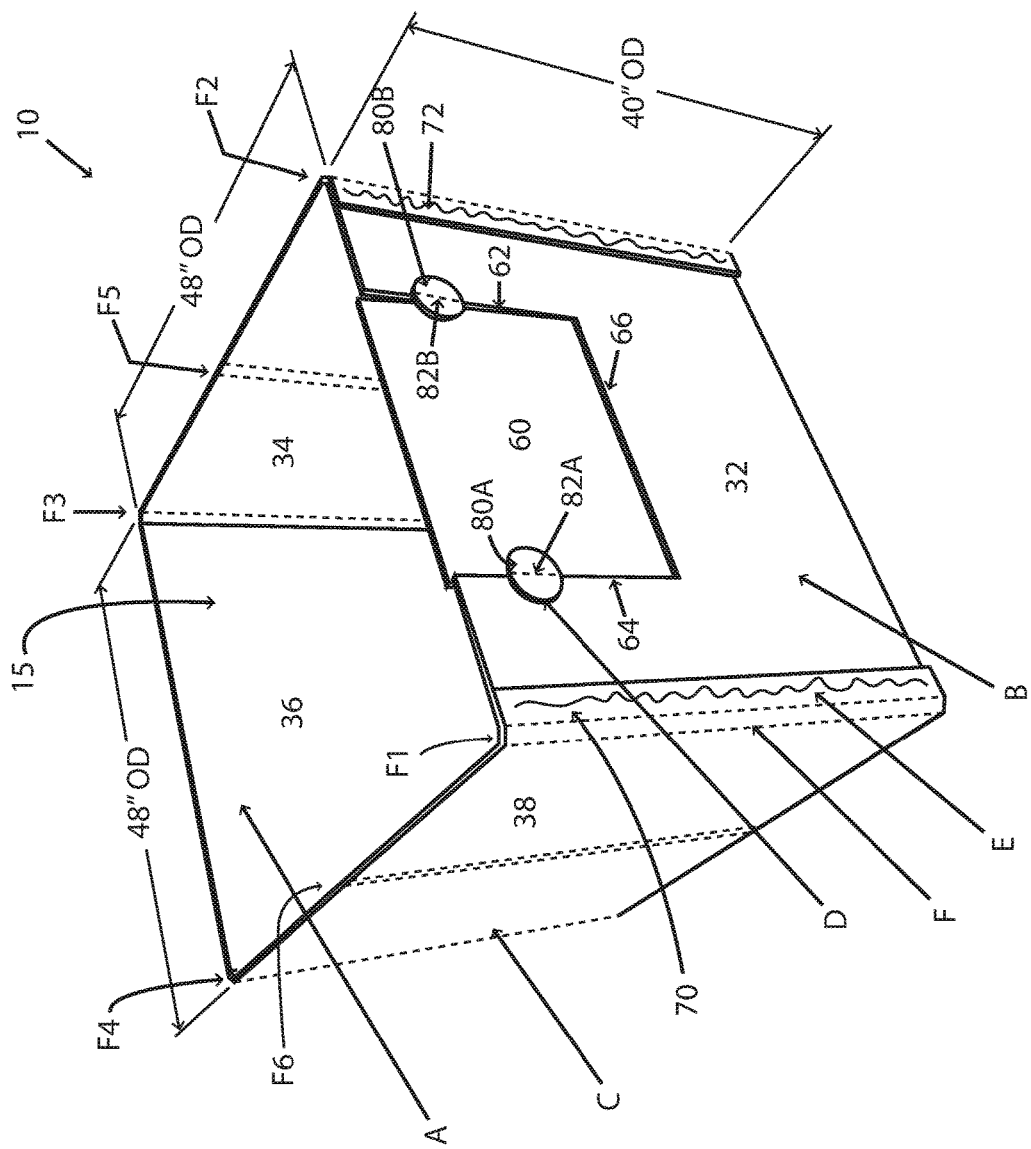
FIG. 5 is a top perspective view of the embodiment of FIG. 1 in accordance with one or more embodiments of the invention.

With reference to FIG. 5, in the exemplary embodiments described above, the door of the box 10 comprises a flap 60 that is integrally formed with the front panel 32. In particular, flap 60 is defined by cutting the front panel 32 along opposing cut lines 62 and 64 and providing a horizontal fold line 66 extending between the bottom ends of the cut lines.

In the particular embodiment shown, the cuts 62 and 64 are generally equal in length and extend from the horizontal fold line 66 to the top end 14 of the front panel 32 in a generally linear fashion. In some implementations, the fold line can comprise a compressed crease, a routed side score or other suitable hinge-like joints between the door flap 60 and the panel 32 that allows the door flap to hinge inward in the direction of the interior volume 15 or in the opposite direction (i.e., outward). The particular manner in which the fold line 66 is provided in the front panel 32 can be a function of a number of factors including cost, ease of manufacture as well as the desired resistance against free movement of the flap in one or more directions about the joint. For instance, as shown in FIG. 4, the fold line 66 is provided by scoring the panel 32 from the interior side/surface (not shown) thereby allowing the door to hinge inward about fold line 66 with less resistance than when it is pushed outwards. It should also be understood that alternative door flap shapes can be cut into the front panel without departing from the scope of the invention. For instance, FIG. 3A shows a box having a door and front wall with cut-lines that define radiused bottom corners 367 of the door flap. It should also be understood that in addition or alternatively, doors/flaps can be provided on other panels or sides of the box, or multiple doors can be provided on a single side without departing from the scope of the invention.

Continuing with reference to FIG. 5, the exemplary box 10 includes two "door pucks" 80a and 80b that assist in the securing the flap 60, maintaining the flap in the closed position. In one exemplary configuration, the door pucks are attached to the outer surface of the front panel 32. For instance, the door pucks can be attached to the surface of the front panel using one of the permanent joining means previously described for permanently joining two panels together and extend across a respective cut-line provided between the side edge of the flap and the adjacent portion of the panel. FIG. 6 is a close-up view of a door-puck 80n attached to the outer surface of panel 32 and extending across the divide between the flap 60 and adjacent edge of the panel 32. Accordingly, the door pucks can resist the flap from hinging outward while allowing the door flap to hinge inward.

In accordance with one or more of the exemplary embodiments, the door pucks can be configured to bend or hinge in a controlled manner when a sufficient amount of force is applied against the puck (e.g., by pulling to flap past the puck). In some implementations, the pucks can be constructed from the same material as the substrate used to form the box structure, such as 8 mm thick corrugated polymer. However different thicknesses of material and/or different materials can be utilized as well to adjust the performance of the pucks such as the desired resistance against bending or deformation. In addition, as shown in FIG. 5, the door pucks 80a and 80b can each include a fold line 82a and 82b that, when attached to the outer surface of panel 32, is preferably aligned with a cut line separating the panel and the flap. Thus, a fold line facilitates the door puck hinging about the fold line when sufficient force is applied against a surface of the door puck.

The particular manner for providing a fold line in a door puck can be a function of a number of factors including cost, ease of manufacture as well as the desired performance of the puck (e.g., a prescribed resistance against folding in one or more directions). For instance, in the exemplary configuration of the door puck 80a shown as Option A to the left in FIG. 7A, the fold line 82a can comprise a score provided on both inner and outer surfaces of the puck. By way of further example, in the exemplary configuration shown as Option B to the right in FIG. 7A, the fold line 82b can comprise a routed side score provided at one side of the puck 80. For instance, a routed score provided on the side of the puck facing the interior 15 of the box 10, when attached, can allow the puck to bend more easily when forced inward (e.g., in the direction of the interior) than outward. A construction of the puck having a directionally biased resistance to folding can be beneficial, for example, by providing greater resistance against the door being pushed/pulled in one direction past the puck (e.g., outward) while allowing the door to be more easily pushed past the puck in the opposite direction (e.g., inward to secure the door back in place), or vice versa. For instance, it can be preferable for a single side-score to be provided on the interior surface of the puck (the side facing the interior volume when attached), so as to provide greater resistance against the flap 60 being pulled open (in the outward direction) and allowing the door to be more easily forced back past the puck and into alignment with the panel. However, as shown in FIG. 6, in addition or alternatively, a fold line/score can be provided on the outside surface of a puck. It should be understood that the two door pucks need not have a uniform construction. For example, one puck can have one particular configuration (e.g., an interior facing side score), while another puck can have a different configuration (e.g., an exterior facing side score). In addition more or fewer pucks can be used than the exemplary two puck configuration shown and described herein. The particular placement of the one or more pucks on the panel can also be adjusted to tailor the performance characteristics and overall resistance to movement of the door flap in one or more directions as necessary. For instance, while at least two pucks are preferably provided on the exterior surface of the front panel 32, in addition or alternatively, one or more pucks can be provided on the interior surface of the front panel. By way of further example, pucks can be provided at different heights relative.

Additional variations in the design of a puck (e.g., 80a and/or 80b) can be implemented to adjust the performance of the puck (e.g., resistance against folding in one or more directions and/or resistance against opening/closing of the door 60) in view of application dependent requirements. For example, the fold (e.g., crease, score, routing) can be oriented in the same direction as the corrugation baffles of the corrugated substrate used for the puck. By way of further example, the fold line can be oriented perpendicularly to the orientation of the baffles/corrugation. Such a configuration can provide relatively greater resistance to folding of the puck than fold-lines oriented substantially parallel to the baffles.

In addition, although the pucks are shown as being four (4) inch diameter discs or pucks, pucks of different diameters and shapes can be used as well to adjust the performance of the pucks. Pucks designed to have at least a semi-circular profile that makes contact with the flap 60 when the flap is being pulled outward can be preferable. In particular, the radiused section of the puck that is arranged to contact the edge of the flap 60 when it is being pulled outward (or alternatively pushed inwards after it is opened completely) provides a relatively consistent resistance against movement of the flap until the apex of the radius is cleared.

Figure 10:
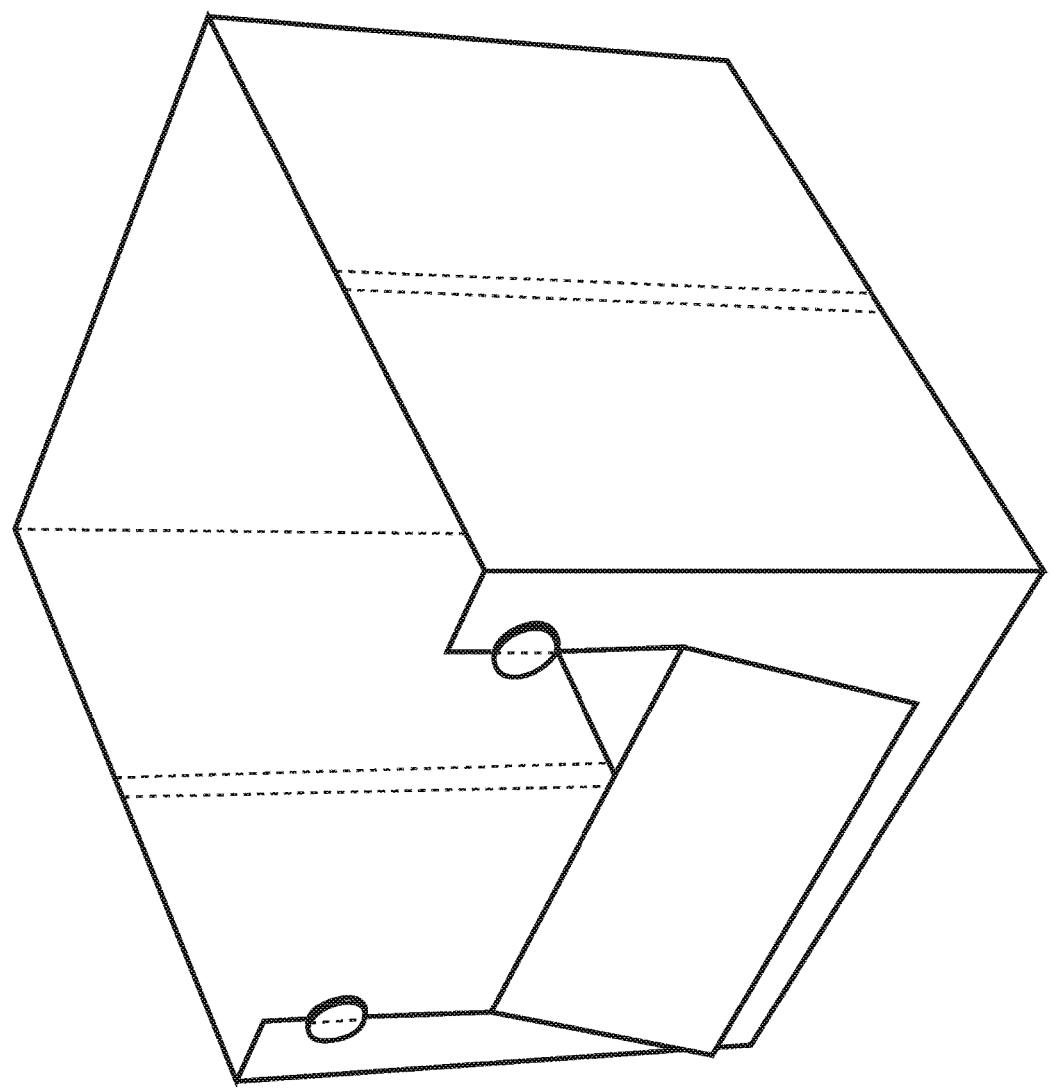
FIG. 10 is a top perspective view of an exemplary box with a fully opened door in accordance with one or more embodiments of the invention.

To further illustrate the exemplary configuration of the embodiments of the invention, FIG. 7B illustrates the puck folding about the fold line in the direction of the arrows shown. FIG. 8 shows a top-perspective view of the exemplary box 10, showing door 60 hinged inward in the direction of the arrow. FIG. 8 also shows a bottom perspective view of a box having three bottom flaps attached to the front and side walls of the box, and a larger bottom flap (e.g., to provide an interior "floor" of the box, shown in dashed line) that extends from the bottom of the rear wall and, as shown, is partially folded down into position. FIG. 9 is a perspective view of a box wherein the door 60 is hinged outward beyond the pucks. FIG. 9 also includes a close up view of one side of the door and puck 80a. FIG. 10 is a perspective view of a box having a door that is opened completely in the outward direction.

Figure 11A:
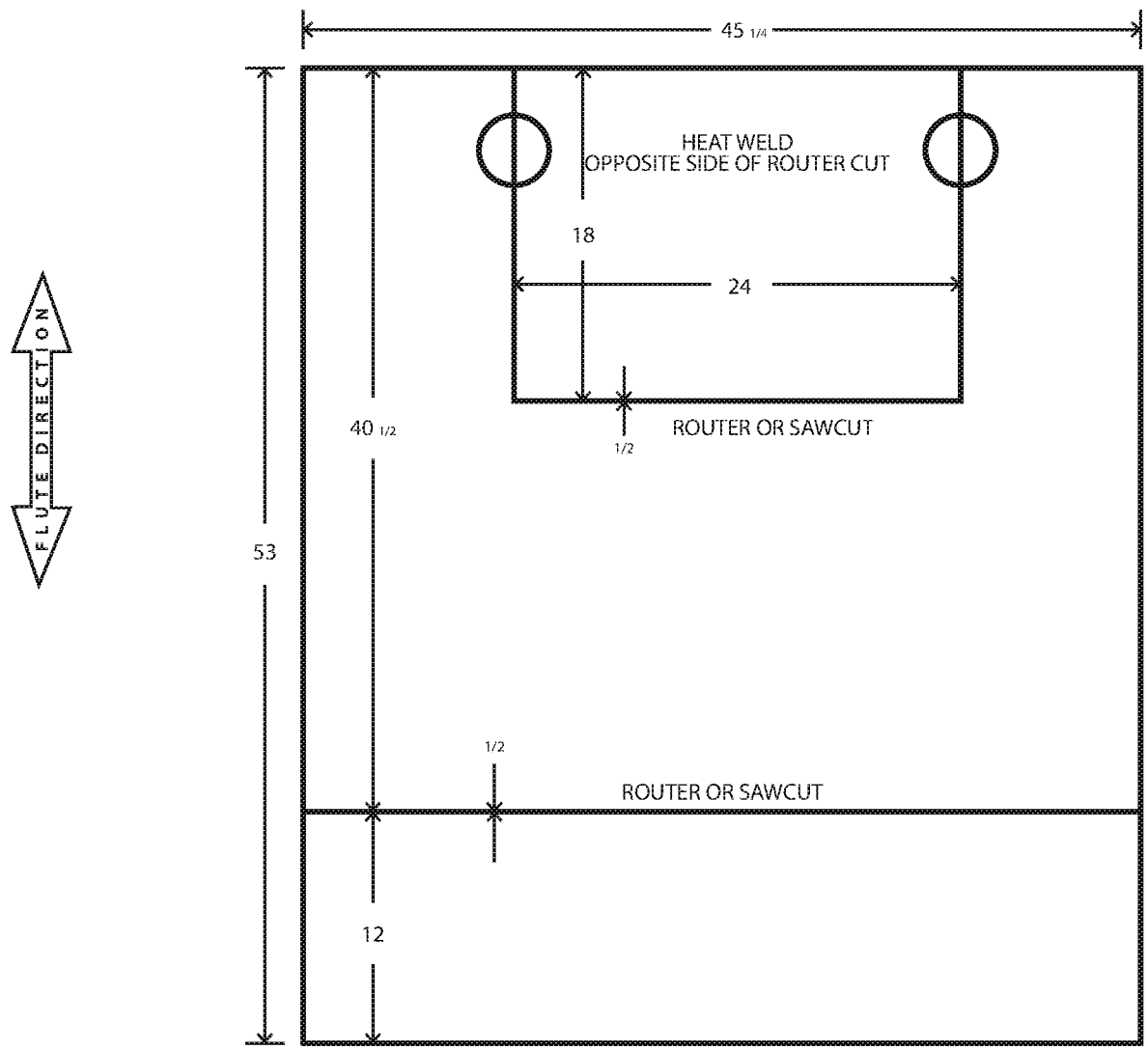
FIGS. 11A-11D are exemplary construction plans for the components a box in accordance with one or more embodiments of the invention.
Figure 11B:
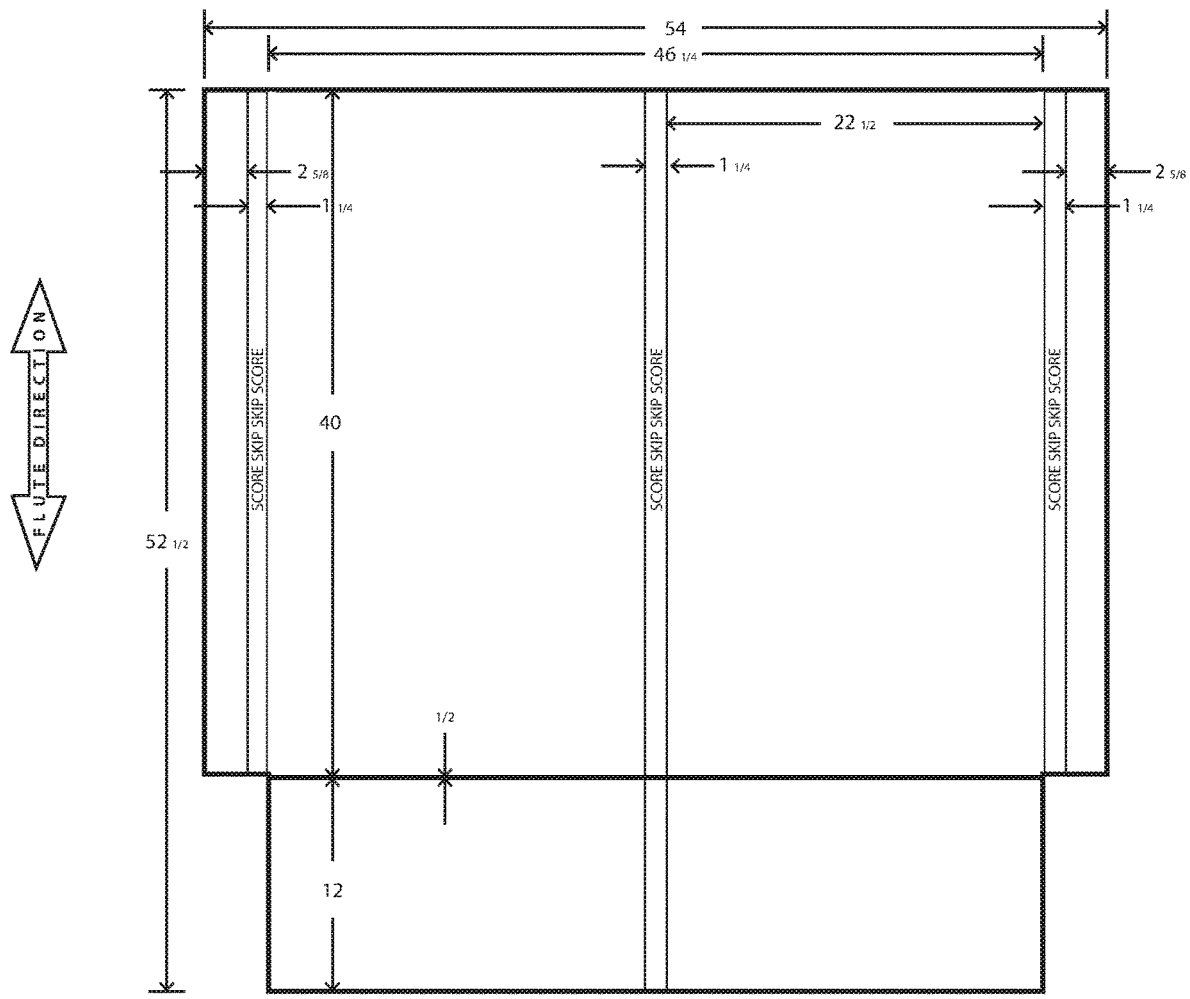
Figure 11C:
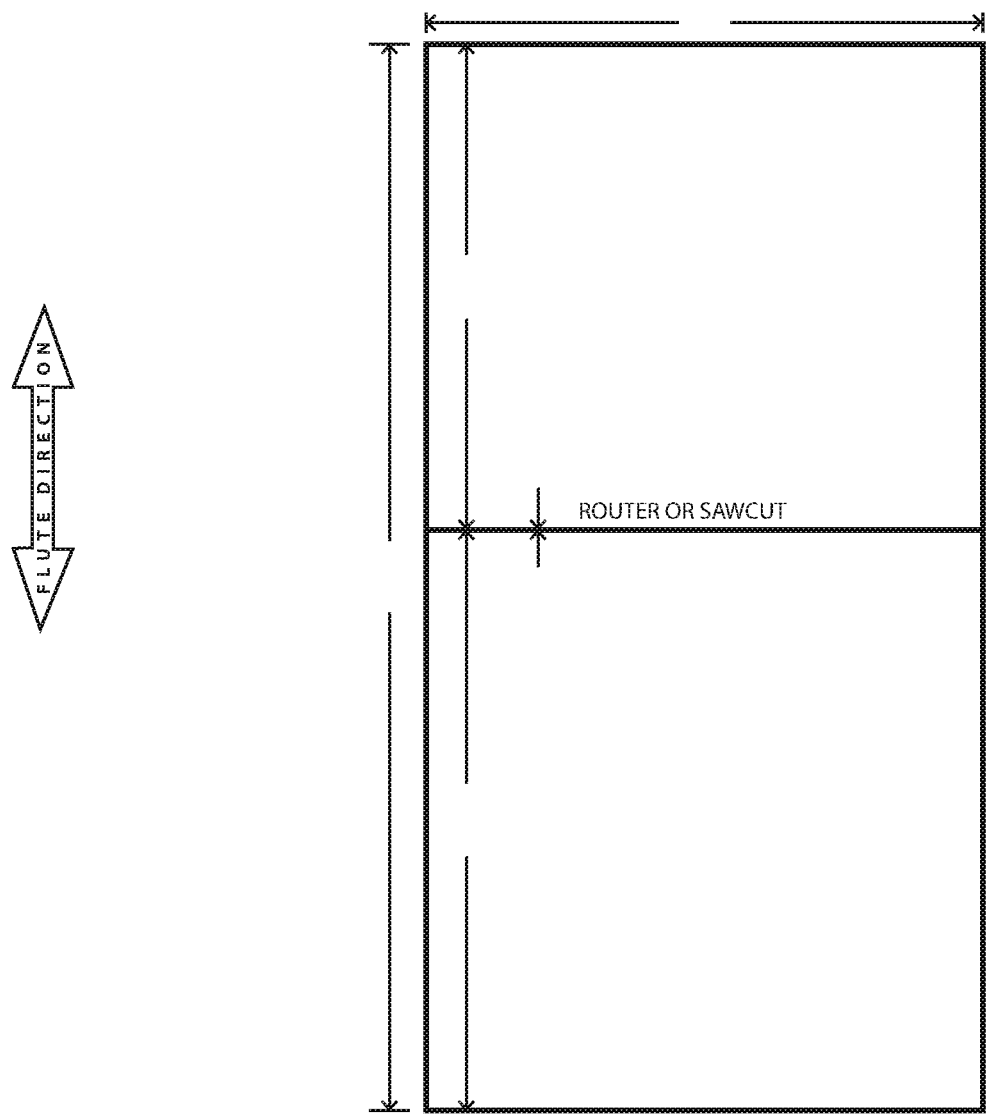
Figure 11D:
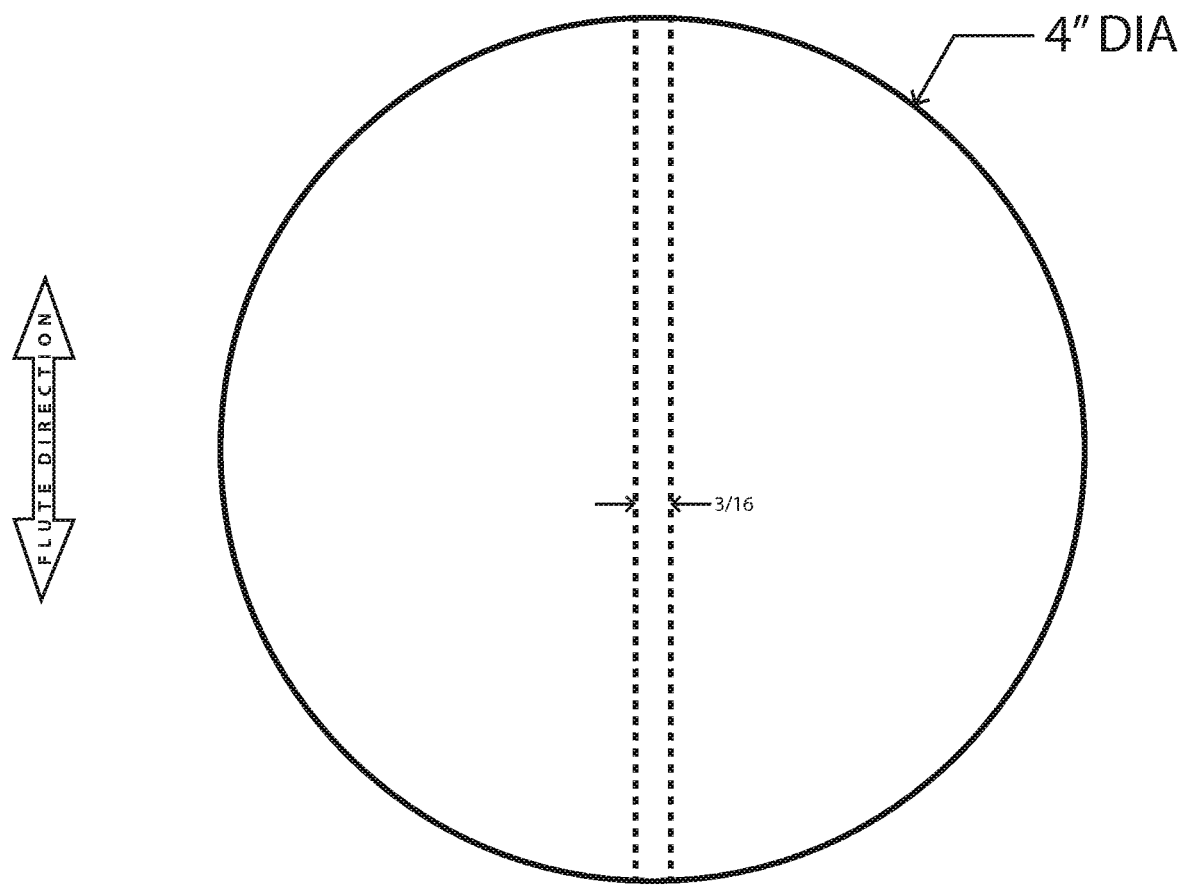

FIGS. 11A-11D are exemplary construction plans for components of a box, such as box 10, in accordance with one or more embodiments of the invention. In particular, FIG. 11A illustrates an exemplary construction plan for the panel that defines the front wall of a box and bottom flap extending therefrom (e.g., panel 32 and bottom flap 42 of box 10); FIG. 11B illustrates an exemplary construction plan for the side panels that define the side walls of a box and bottom flaps extending therefrom (e.g., panels 34 and 38 and bottom flaps 44 and 48 of box 10); FIG. 11C illustrates an exemplary construction plan for the panel and bottom flap extending therefrom that define the back wall and floor of the box (e.g., panels 36 and bottom flaps 46 of box 10); FIG. 11D illustrates an exemplary construction plan for a door puck (e.g., puck 80a or 80b of box 10).

Figure 12A:
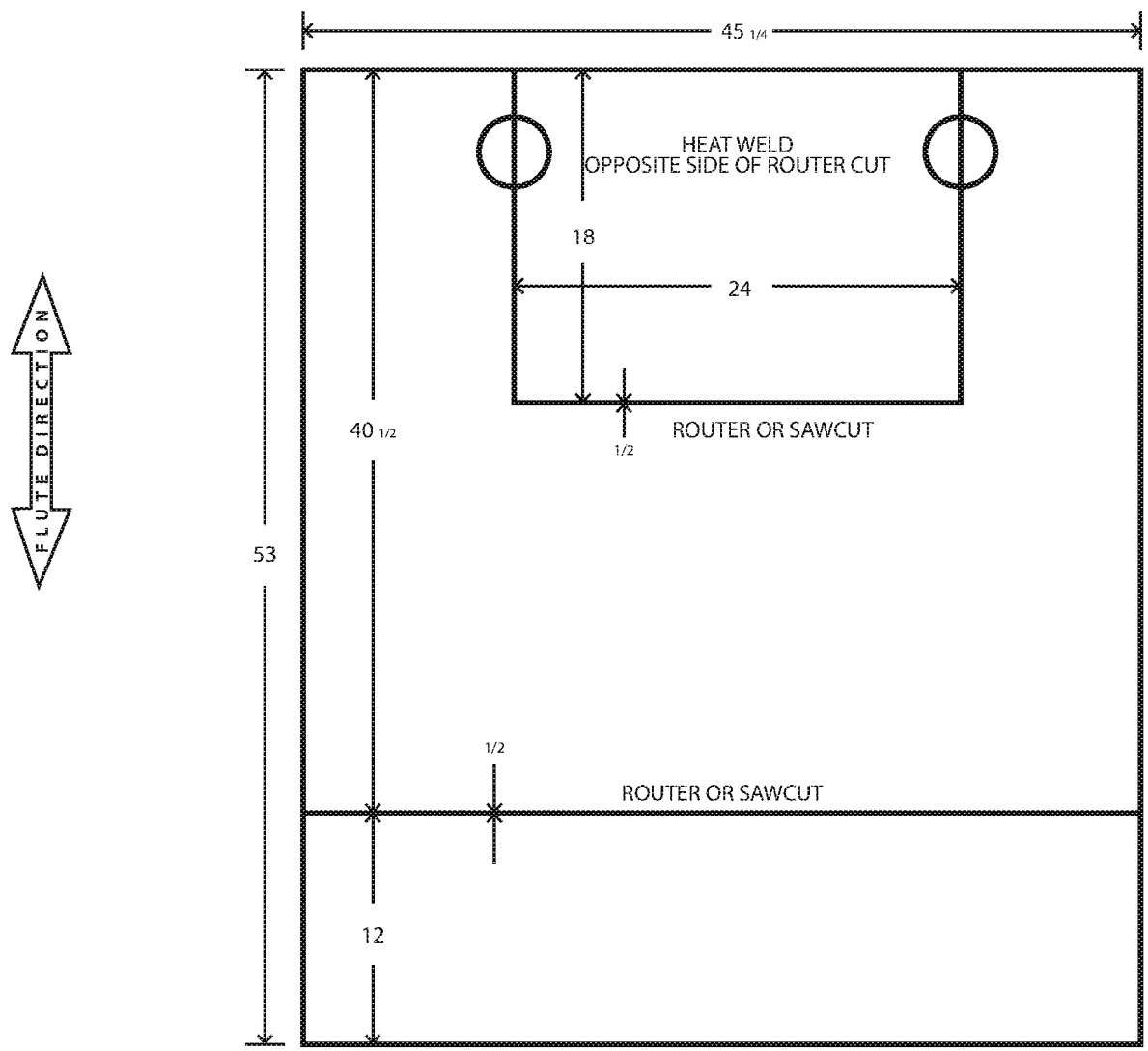
FIGS. 12A-12D are exemplary construction plans for the components a box in accordance with one or more embodiments of the invention.
Figure 12B:
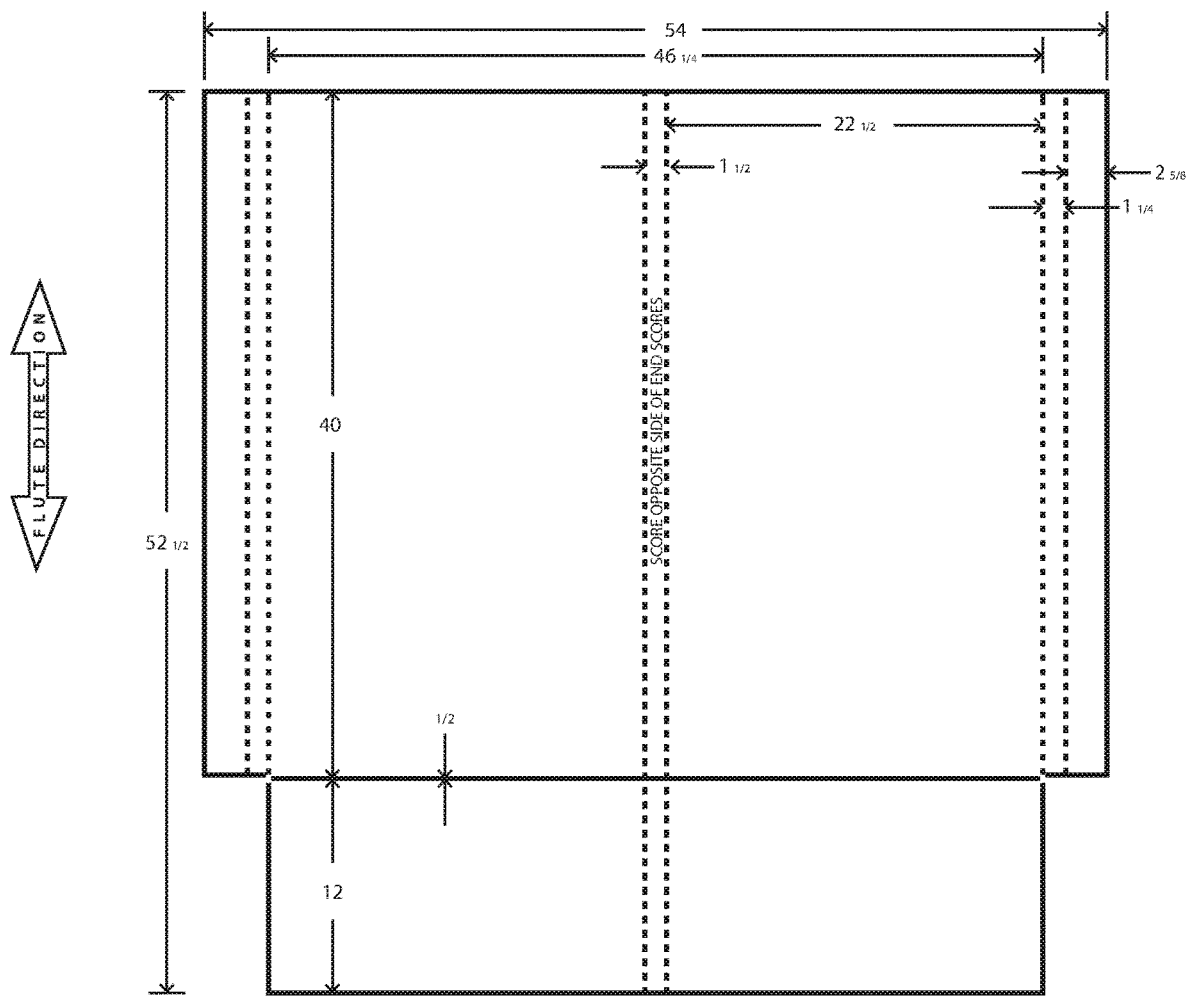
Figure 12C:
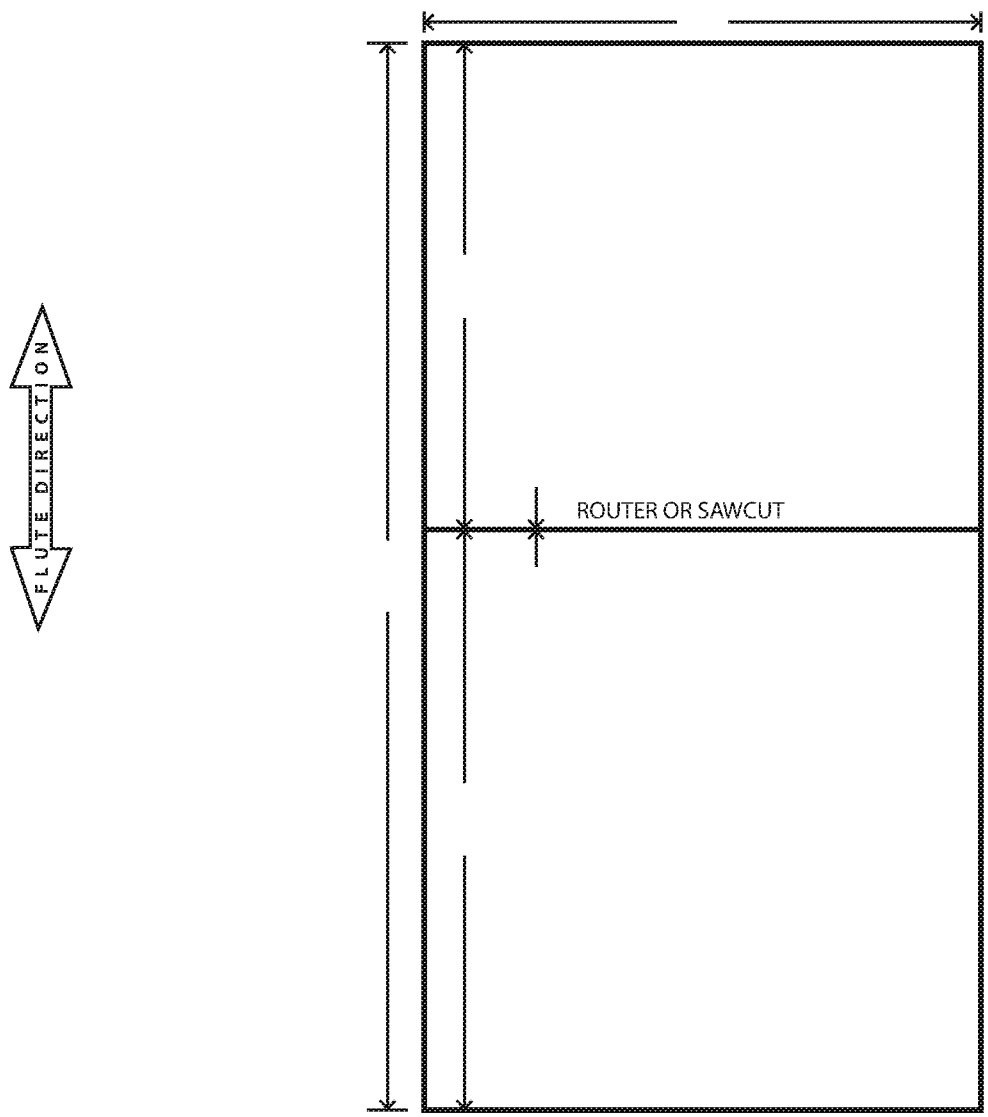
Figure 12D:
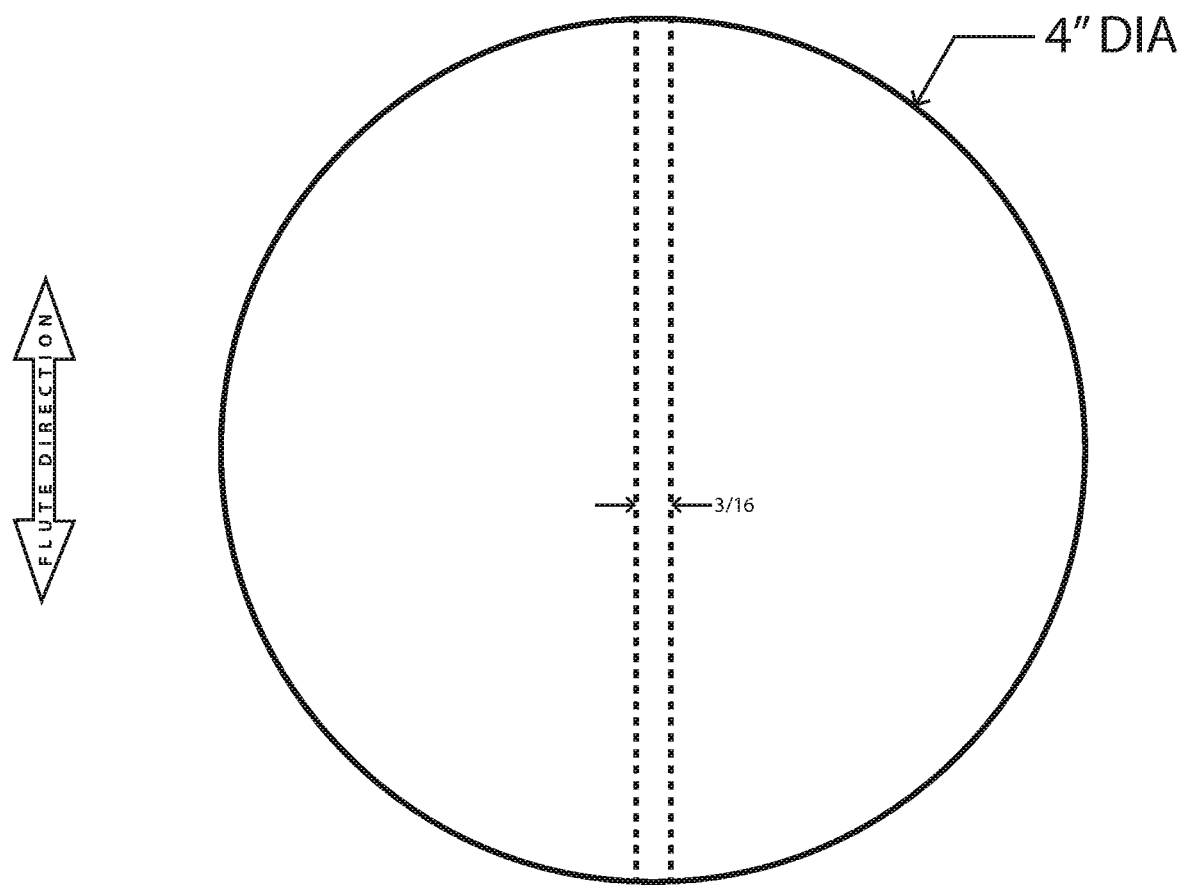

In accordance with one or more embodiments of the invention, exemplary construction plans for components of a box, some of which are constructed different from those shown in FIGS. 11A-11D, are shown in FIGS. 12A-12D. In particular, FIG. 12A illustrates an exemplary construction plan for the panel that defines the front wall of a box and bottom flap extending therefrom (e.g., panel 32 and bottom flap 42 of box 10); FIG. 12B illustrates an exemplary construction plan for the side panels that define the side walls of a box and bottom flaps extending therefrom (e.g., panels 34 and 38 and bottom flaps 44 and 48 of box 10); FIG. 12C illustrates an exemplary construction plan for the panel and bottom flap extending therefrom that define the back wall and floor of the box (e.g., panels 36 and bottom flaps 46 of box 10); FIG. 12D illustrates an exemplary construction plan for a door puck (e.g., puck 80a or 80b of box 10).

It is to be understood that like numerals in the drawings represent like elements through the several figures, and that not all components and/or steps described and illustrated with reference to the figures are required for all embodiments or arrangements.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, as set forth in each and any of the following claims.

What is claimed is:

1. A bulk-size shipping box configured to be transitioned between a collapsed state and an operative state for storing contents within an interior volume of the box, comprising:
    a continuous series of panels made of a substrate material and arranged to define four sidewalls of a rectangular box, wherein the sidewalls extend from a bottom end of the box toward a top end of the box in a generally vertical direction and define a hollow central cavity of the box when in the operative state, and wherein the four walls include a front wall, an opposing back wall a right wall and an opposing left wall,
        wherein each of the right wall and left wall are bisected by a vertical fold line extending in the vertical direction from the bottom end to the top end whereby the vertical folds enable the left and right walls to be collapsed inwards when transitioning the box from the operative state to the collapsed state;
    a bottom flap extending from the bottom end of a respective sidewall, wherein a lengthwise fold line defines a border between the bottom end of the respective sidewall and an adjacent end of the bottom flap, wherein the bottom flap hinges about the lengthwise fold line in at least an inward direction, and wherein the bottom flap has a width such that the it extends at least partially across an internal footprint of the box when in an operative state; and
    the front wall further comprising:
        a door flap, wherein the door flap is defined by two spaced apart elongate cuts through a front wall panel that extend generally vertically from a respective opposing end of a horizontal fold line to the top end of the front wall panel, and wherein the door flap hinges about the horizontal fold line in the inward direction or an opposing outward direction and thereby provides an opening through the front wall and access to the interior volume of the box, and
        a door retaining puck attached to an outer surface of the front wall, wherein a portion of the door puck that is not attached to the front wall extends across one of the two elongate cuts and an adjacent portion of the door flap thereby providing resistance against the door flap hinging outward, and wherein the door puck is configured to deflect outward when a given amount of force is applied against the door puck in an outward direction thereby enabling the door flap to be hinged outward.

2. The box of claim 1, wherein the substrate material is a corrugated plastic sheet.

3. The box of claim 1, wherein the box is configured to be transitioned into the collapsed state by collapsing the left and right sidewalls inward along respective vertical fold lines and folding the bottom flap about the lengthwise fold line such that the bottom flap is flush with the respective sidewall, and wherein the box, when in the collapsed and flat state has a footprint that is generally the same as the footprint of the box when in the operative state.

4. The box of claim 1, wherein the front wall panel including the door flap combine to provide a generally flat and continuous rectangular front wall.

5. The box of claim 1, wherein the horizontal fold line provided in the front wall comprises one or more of a compressed crease, a routed side score, and a hinge joint between the door flap and the front panel.

6. The box of claim 1, wherein the horizontal fold line comprises a scoring line provided on an interior surface of the front wall panel and thereby allows the door flap to hinge inward about the horizontal fold line with less resistance than when hinging outward.

7. The box of claim 1, wherein the door puck is configured to deflect in a controlled manner when a given amount of force is applied against the puck.

8. The box of claim 7, wherein the door puck comprises: a fold line on one or more of an interior surface and an exterior surface of the puck, wherein the door puck is attached to the front panel such that the fold line is generally aligned with the one elongate cut it extends across.

9. The box of claim 7, wherein the door puck is configured to have a directionally biased resistance to folding.

10. The box of claim 1, wherein the portion of the door puck that makes contact with the door flap has a radiused profile.

11. The box of claim 1, further comprising a plurality of door pucks.

12. The box of claim 1, further comprising a plurality of bottom flaps.

13. The box of claim 12, wherein at least one bottom flap extends from a given sidewall among the left and right sidewalls, and wherein the vertical fold line bisecting the given sidewall extends across the width of the at least one bottom flap.

14. The box of claim 12, wherein at least one of the bottom flaps is sized to extend across the internal footprint of the box when in the operative state.

15. The box of claim 1, wherein a fold line in a section of the substrate material comprises one or more of: a cut, a compressed crease, a score, a heat score and a routing line.

16. The box of claim 1, wherein a fold line comprise multiple spaced apart fold lines.

17. The box of claim 1, wherein the box is a bulk size shipping box that has approximately 48"×48" (length× width) outer footprint and an approximate outer height of 40".

18. The box of claim 1, further comprising: a removeable top panel configured to be supported by the top ends of the side walls and extend across a top opening of the box.

19. The box of claim 1, wherein the continuous series of panels are defined by a single sheet of substrate material.

20. The box of claim 1, wherein the continuous series of panels are defined by a plurality of joined sections of substrate material.

* * * * *